United States Patent
Rose

[11] Patent Number: 5,911,876
[45] Date of Patent: Jun. 15, 1999

[54] INSITU ZEOLITE FILTER BED SYSTEM FOR THE REMOVAL OF METAL CONTAMINANTS

[76] Inventor: Jane Anne Rose, 4 Turner La., Lancaster, Mass. 01523

[21] Appl. No.: 08/954,667

[22] Filed: Oct. 20, 1997

Related U.S. Application Data

[63] Continuation-in-part of application No. 08/593,883, Jan. 30, 1996, Pat. No. 5,679,256, which is a continuation of application No. 08/262,767, Jun. 20, 1994, abandoned.

[51] Int. Cl.⁶ .................................................. C02F 1/42
[52] U.S. Cl. ..................... 210/96.1; 210/170; 210/196; 210/291
[58] Field of Search .................. 210/662, 663, 210/669, 679, 682, 688, 747, 170, 96.1, 289, 291, 912, 913, 914, 196, 197

[56] References Cited

U.S. PATENT DOCUMENTS

| | | | |
|---|---|---|---|
| 4,087,375 | 5/1978 | Tanno | 210/682 |
| 4,107,044 | 8/1978 | Levendusky | 210/291 |
| 4,473,477 | 9/1984 | Beall | 210/747 |
| 4,687,581 | 8/1987 | Macedo et al. | 210/670 |
| 4,778,628 | 10/1988 | Saha et al. | 252/633 |
| 5,043,076 | 8/1991 | Alexander | 210/747 |
| 5,196,124 | 3/1993 | Connor et al. | 210/747 |
| 5,679,256 | 10/1997 | Rose | 210/662 |

*Primary Examiner*—Ivars Cintins
*Attorney, Agent, or Firm*—Richard P. Crowley

[57] ABSTRACT

A system for remediating groundwater contaminated with radionuclides, consisting of an underground bed of crushed zeolites. Distribution pipes convey contaminated groundwater to the zeolite bed by means of a pump, which draws the contaminated water through wells from an underground plume of released waste mixed with groundwater. The radionuclides in the water undergo capture with the zeolite minerals, and lock into the zeolite crystal lattice. After the contaminated water passes through the zeolite bed, it is collected by a series of collection pipes and conveyed to a sampling station, where it can be determined whether the water has been decontaminated sufficiently to discharge it by piping to a river outfall or back to the ground. When functioning, the system contains the released contaminants on the waste site and prevents further spread and migration of the contaminated water by means of the cone of depression created by the pumping well. When the system is fully charged with radionuclides, burial of the zeolite bed results in a permanent solution to the disposal of the radionuclides in a stable configuration. The radionuclides are locked into the crystal structure of a mineral, below ground but above groundwater level, similar to their condition before being mined.

19 Claims, 3 Drawing Sheets

INSITU ZEOLITE FILTER BED SYSTEM FOR THE REMOVAL OF METAL CONTAMINANTS

REFERENCE TO PRIOR APPLICATIONS

This application is a continuation-in-part of U.S. Ser. No. 08/593,883, filed Jan. 30, 1996, now U.S. Pat. No. 5,679,256, issued Oct. 21, 1997, which application is a continuation of U.S. Ser. No. 08/262,767, filed Jun. 20, 1994, now abandoned.

FIELD OF THE INVENTION

This invention is in the field of contaminated groundwater cleanup systems, in particular groundwater that is contaminated by radionuclides.

BACKGROUND OF THE INVENTION

Recently enacted environmental laws such as Superfund require that responsible parties who have contaminated groundwater through industrial processes or by other means must remediate the polluted water. This can be accomplished by pumping the groundwater to the surface and treating it, then discharging it back into the ground or releasing it to a surface water body. Methods for treating contaminated water depend upon the contaminant. Hydrocarbons are common contaminants and can be treated by carbon absorption or by air stripping—allowing the hydrocarbon to volatize to the air. Bioremediation is another means of cleaning groundwater. With this method, microorganisms that consume hydrocarbons are introduced into the water, either in situ or after pumping the water into a tank constructed for the purpose.

Part of post-Cold War government activities is environmental restoration of nuclear weapons installations throughout the country. Groundwater at these sites is commonly contaminated with radionuclides. The typical means of treating water contaminated with hydrocarbons does not work for cleaning water contaminated with radionuclides. Carbon will not absorb most radionuclides. Most radionuclides are non-volatile, so they cannot be air-stripped. It would create a risk of human exposure by inhalation to off-gas radionuclides into the air. Bioremediation is an ineffective clean-up strategy. When radionuclides are consumed by microorganisms, they in turn become radioactive, and remain so after death.

Containment of radioactive groundwater has been employed as a remediation strategy. This method emplaces slurry walls and/or grout curtains underground, where they act as dikes to prevent the radioactive groundwater from flowing off the site, potentially into streams and other surface water features that may be used for recreation, drinking water, irrigation water, and subsistence fishing. Slurry walls and grout curtains are usually not effective in completely containing contaminated groundwater. Radioactive contaminants are often heavy, and tend to sink in the groundwater, where they can flow under the slurry wall or grout curtain. Also, these and other containment methods are not permanent constructions, whereas the radioactive elements remain hazardous for their respective half-lives. The half-lives of elements typically found on Department of Energy nuclear weapons manufacturing sites may range from approximately 125 years for cesium isotopes to 2.3 billion years for some uranium isotopes. The slurry walls and grout curtains would require maintenance, patching and rebuilding for an indefinite period of time, which would need to take place in a hazardous environment.

A further problem with containment methods is the contaminated soils generated in their construction. These soils require disposal, transportation and often, treatment, which involves considerable expense. The risk of exposure to workers must be mitigated throughout the construction process and the treatment, removal and disposal of the contaminated soils, generating even more expense and liability.

An experimental treatment of contaminated groundwater is freezing. Freezing immobilizes the contaminated groundwater in place, but the process is expensive and temporary as well as experimental.

The U.S. Department of Energy is actively seeking groundwater treatment technologies through solicitations, requests for proposals, and funding for innovative research and development of groundwater treatment systems. Presently the DOE has adopted a position that because groundwater treatment systems for extracting radionuclides from contaminated groundwater currently do not exist, groundwater cleanup on DOE sites is not technically feasible. The DOE has sought special waivers from Superfund cleanup standards. Waivers have not been granted, however, and the DOE continues to seek out and fund the development of groundwater cleanup technologies in order to attain compliance with existing environmental laws.

SUMMARY OF INVENTION

The present invention applies the molecular sieve properties of zeolite to the restoration of groundwater and surface water resources. In this process, on-site, below-ground zeolite beds are used to filter radionuclides from groundwater that has been pumped to the zeolite bed. The contaminated water trickles through the zeolite bed. In the course of flowing through the zeolite bed, radioactive ions in the water are exchanged for nonradioactive ions such as sodium and calcium that occur naturally in the zeolite crystal structure. The water is collected from the base of the zeolite bed, tested to determine if it has been completely stripped of radionuclides, and then discharged to a surface water body or the groundwater. The radioactive material, which originally was mined from minerals in the ground, again becomes locked into the crystal structure of a mineral, and simultaneously returned to the ground. When the zeolite bed is fully charged with radionuclides, the entire bed is buried with earth. The radioactive elements are thereby disposed in a stable, immobile configuration, which would fulfill the requirements of the existing environmental laws.

The invention relates to a system and method for the in situ removal of metal contaminants, such as radionuclides, and various contaminant metals from contaminated waste water by the use of a zeolite filter bed.

REFERENCE NUMERALS IN DRAWINGS

Figure 1:
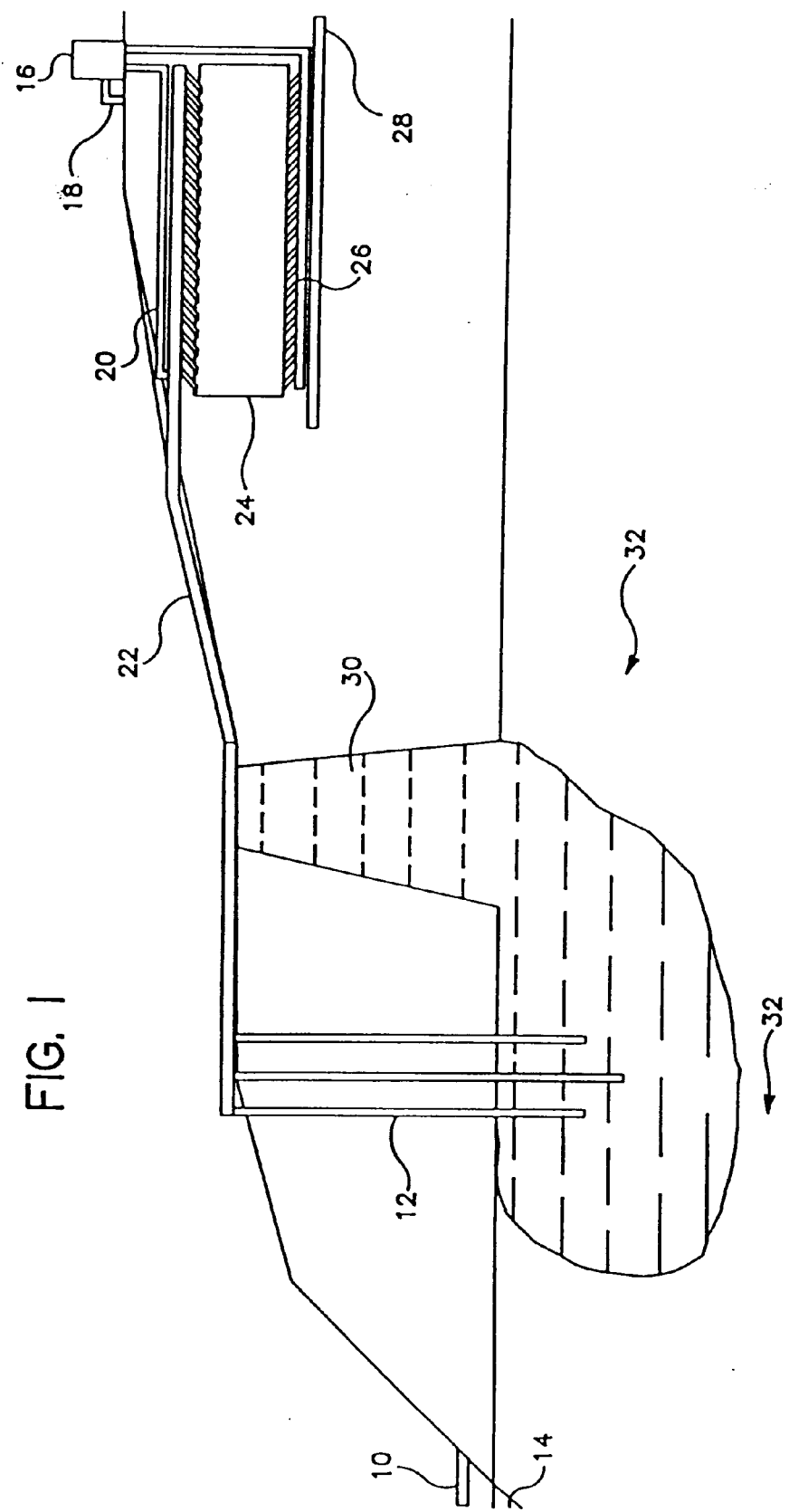
FIG. 1 shows a cross-section of the zeolite filter bed process assembled in an area where a release of a contaminant to the environment has occurred, resulting in the contamination of groundwater. If the contaminated groundwater plume or "release" (30) is not remediated, it will flow into the river (14), endangering the river flora and fauna and creating an exposure route to human populations. The zeolite filter bed process uses pumping wells (12) to deliver the contaminated water by way of an inflow pipe (22) to a bed of zeolite (24) that is constructed underground.

10. River outfall
12. Pumping wells
14. River
16. Sampling station
18. Pipe to river outfall
20. Return pipe
22. Inflow pipe
23. Perforated distribution pipes
24. Zeolite bed
25. Excavation for zeolite bed
26. Collection pipe
27. Perforated collection pipes
28. Clay layer
30. Release
32. Groundwater flow direction

DETAILED DESCRIPTION OF ZEOLITE FILTER BED TECHNOLOGY

The zeolite filter bed process is designed to remediate groundwater contaminant plumes composed of groundwater and dissolved radionuclides, a situation that commonly occurs at Department of Energy (DOE) nuclear weapons manufacturing sites. The process is designed to contain, treat and dispose of contaminants on site. The process is conceived to minimize worker exposure to contaminated groundwater. Public and environmental exposure would ultimately be minimized as well. The process is simple in design, and can be constructed of ordinary, inexpensive materials by construction workers possessing no special technical skills.

FIG. 1. depicts a cross-section of an area of a waste site where a release of a radionuclide contaminant (30) has created a plume of contaminated groundwater. The groundwater flow direction (32) is towards the river (14). Migration of the contaminated groundwater to the river potentially exposes humans to contamination via drinking water, fish consumption, irrigation, sports and recreation. It also results in environmental exposures to fish and wildlife.

A zeolite filter bed and associated piping is shown on the right side of FIG. 1. The zeolite bed (24) is constructed in a trench, which has been excavated in an area of uncontaminated soils, but which has been designated as a waste disposal area. A typical trench may be about 50 ft.×50 ft.×15 ft. in dimensions. Available area for disposal and topography should be considered when determining site-specific dimensions for zeolite beds. The trench is lined with a clay layer (28), approximately 6 inches thick, before the zeolite bed and associated piping is installed. Suitable clays include nontronite, kandite, illite and chlorite. Nontronite forms an effective water barrier, and is inexpensive and readily available. The zeolite filter bed and associated piping is initially exposed, and may be buried following construction. Alternatively, burial of the bed and piping systems may take place after the zeolite bed has been fully charged with radionuclides. An advantage of delaying burial of the bed is that any piping that has become contaminated in the course of carrying contaminated water may be placed on top of the zeolite bed before "capping", or final burial of the system.

Figure 2:
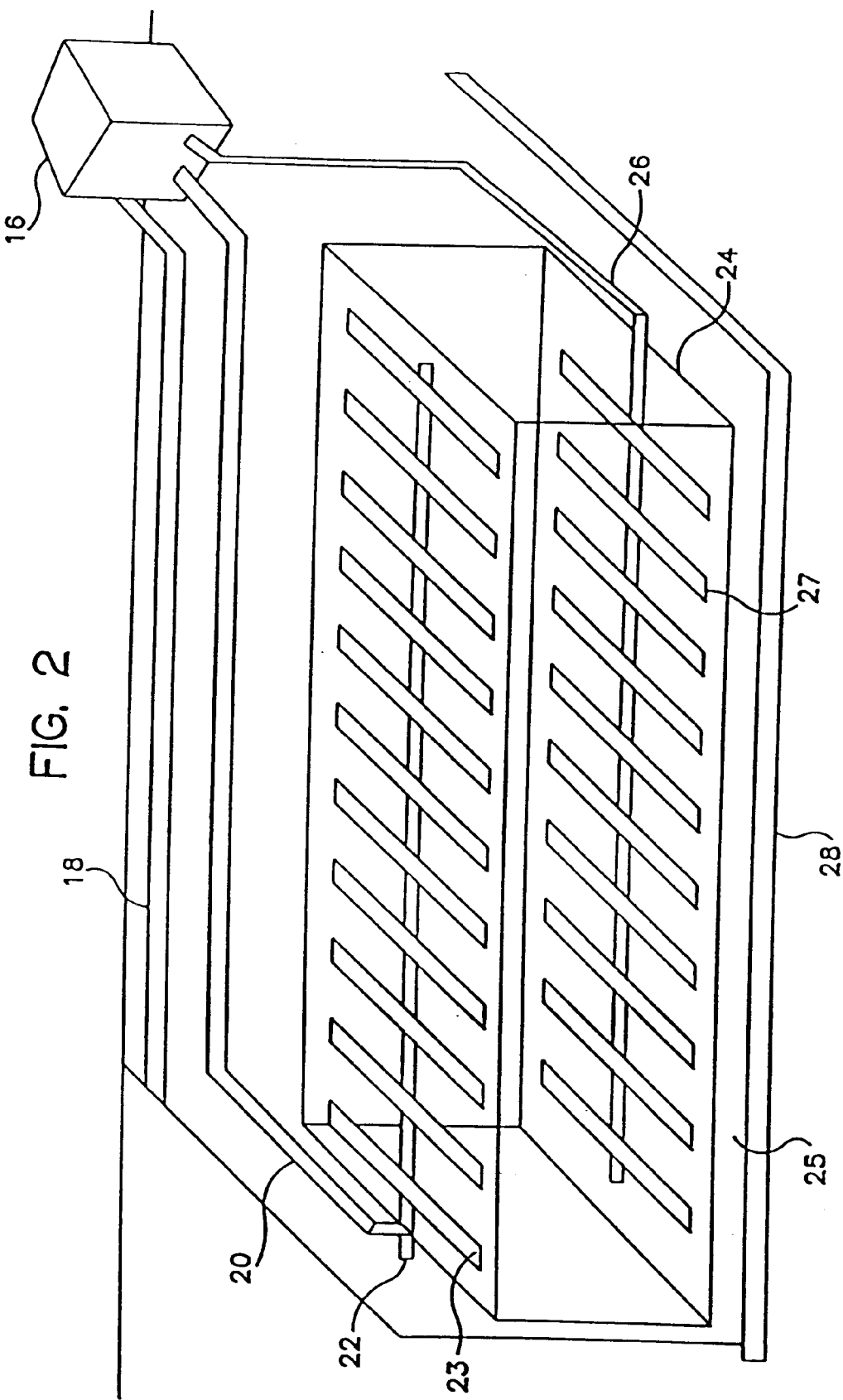
FIG. 2 is a view in detail of the zeolite bed showing a base clay layer below the bed (28), and piping for water delivery (22), distribution (23), collection (26, 27), sampling (16) and outfall (18).

A collection pipe (26, FIGS. 1 and 2) which is somewhat shorter than the long dimension of the trench, is placed on top of the clay layer. The collection pipe is of sufficient length to reach a sampling station (16) located on the surface. The collection pipe is also connected to a lattice of perpendicular perforated collection pipes (27) that are positioned at the lowest level of the zeolite bed above the clay layer.

The trench is then filled with a thick layer of fine-grained zeolite. The specific type of zeolite used to fill the trench should be based on the radionuclides dissolved in the groundwater at a specific site. There are a number of different types of zeolite, and specific radionuclides are best extracted using the appropriate type of zeolite. Chabazite, for example, can effectively remove $^{134}$Cs, $^{137}$Cs and $^{90}$Sr from effluent (Eyde, 1982, Zeolite deposits in the Gila and San Simon Valleys of Arizona and New Mexico: in *Industrial Rocks and Minerals of the Southwest:* New Mexico Bur. Mines Mineral Resources Circ. 182, 65–71). The zeolite may be mixed with minerals from the Palygorskite group of minerals, which are absorbent clay minerals with chain crystal structures that trap unusual cations in the interlayer region of the crystal lattice. Sepiolite and attapulgite are Palygorskite minerals commonly mixed with natural zeolite, and could be used in the zeolite bed described herein to add absorbency.

Synthetic zeolite may be used. Some synthetic zeolites are designed to facilitate reversibility of the ion exchange action, which is an unnecessary property for zeolite used in the filter bed process. Synthetic ion exchange resins also are capable of filtering radionuclides. However, they function so that the exchange reaction is reversible, which is not a desired quality for the process herein described. They are more expensive than natural zeolite. Ion exchange resins concentrate the radionuclide to a much greater extent than natural zeolite, resulting in a final form that is less desirable for permanent burial due to the highly concentrated nature of the radioactive materials. Many kinds of naturally occurring zeolite minerals may be used in zeolite beds, for example, heulandite, stilbite or natrolite.

An inflow pipe (22) extends from the pumping wells (12) to the top of the zeolite layer in the filter bed. The inflow pipe may be partially or completely underground. Perforated distribution pipes (23) are connected to the inflow pipe and distribute the radionuclide-laden water evenly over the zeolite bed. If desired, a distribution box similar to those used in septic systems may be installed between the inflow pipe and the distribution pipe for efficient distribution of the contaminated water over the zeolite bed. As the water flows down through the zeolites, the radionuclides are removed by an ion exchange process. The water is collected in the lattice of collection pipes at the bottom of the zeolite bed. A pump, which may be located in the sampling station, draws the treated water to the sampling station (16), where it can be sampled to determine whether it is sufficiently pure to be discharged through a pipe to a river outfall (18). If it is determined that the water needs further treatment, it can be returned to the zeolite bed through a return pipe (20).

Figure 3:
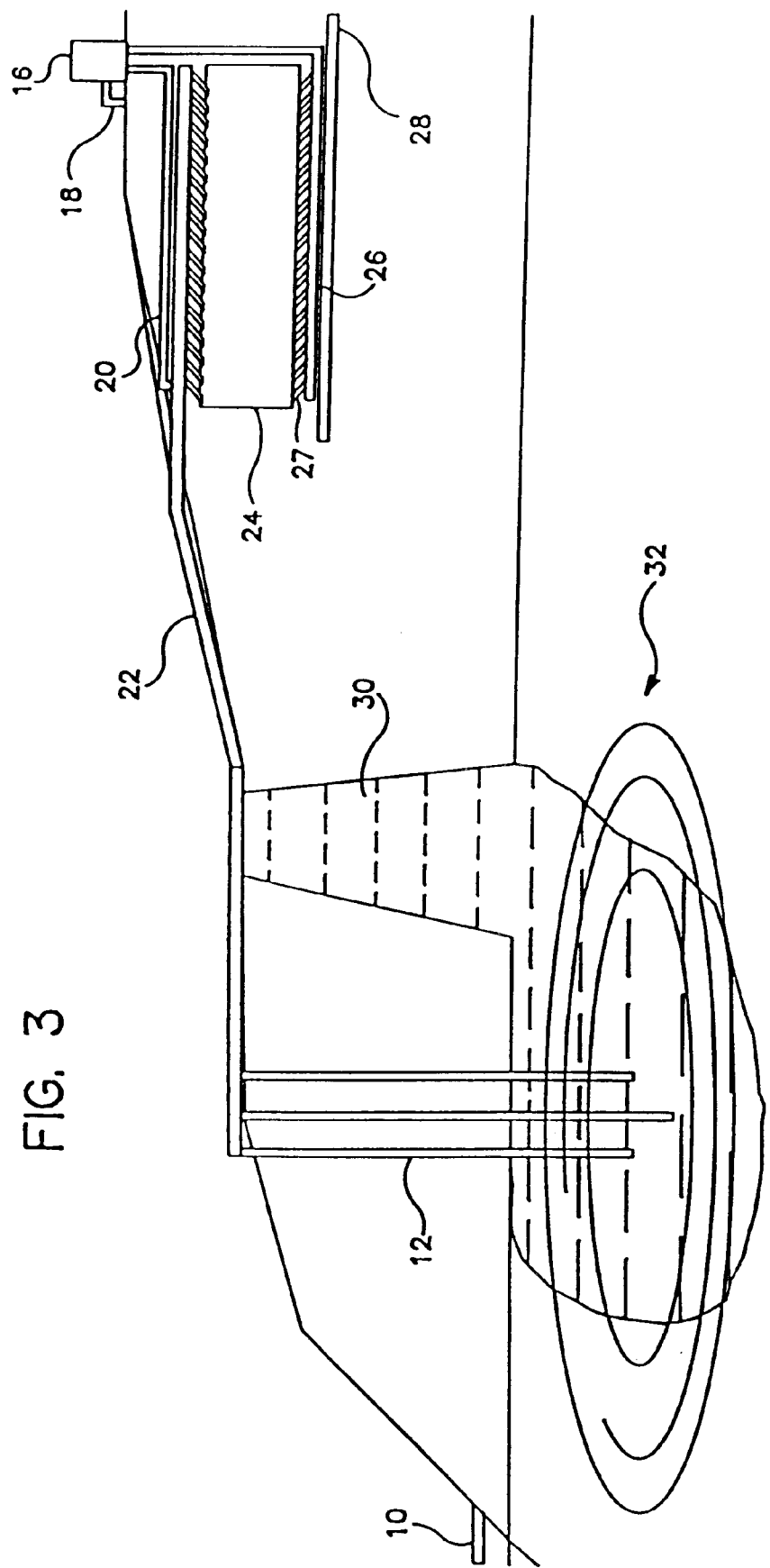
FIG. 3 is a cross-section that shows the filter bed process during pumping conditions, whereby the cone of depression created by the pumping wells prevents the contaminated water or release (30) from flowing into the river.

When the pumping wells (12) are activated, and the system is mobilized, groundwater flows towards the wells (FIG. 3, (32)). The reversal of the direction of flow of the groundwater contaminant plume contains the contamination, and prevents its migration to the river or other offsite locations.

After a period of time in operation, the zeolite bed will become completely charged with radionuclides. When this occurs, the water sampled from the sampling station (16) will retain the radioactive constituents. At this juncture, the bed must undergo closure and a new zeolite bed will need to be put on line for continued treatment of groundwater.

Closure of the bed requires the discontinuation of pumping and assessment of the inflow and outflow piping and sampling station to determine whether they have become contaminated by the radionuclides. If they are found through testing to be contaminated, they may be carefully dismantled and placed on top of the zeolite bed. A clay or plastic liner is then placed over the entire zeolite bed to prevent rainwater or surface water infiltration, and the bed is then covered over with soil. Suitable precautions should be taken to designate the area as a waste burial area, to prevent future development involving excavation.

The zeolite filter bed process is simple in design, relatively inexpensive to construct, and uses naturally occurring mineral resources that are readily available. The process minimizes human contact with radioactive wastes, thereby decreasing worker risk. High risk to workers is one of the most intractable problems facing the Department of Energy in their efforts to accomplish clean-up of the nuclear weapons complex (O'Toole, 1993, *Hazards ahead: Managing Cleanup Worker Health and Safety at the Nuclear Weapons Complex.* U.S. Congress, OTA-BP-O-85).

The zeolite filter bed process may be easily adapted to accomplish the remediation of surface water contamination by radionuclides. Wash water from remedial activity, effluent and other waste streams composed of water contaminated with radionuclides may also be treated by this method. The contents of waste ponds, holding ponds, contaminated wetlands and other contaminated surface water problems may be remediated using this process. The zeolite filter bed process may be effectively adapted to remediate waters in wetlands and marshy areas by pumping the contaminated water into the zeolite bed and recharging the remediated water to the wetlands at the same rate. The water table in the wetlands or marsh would thus remain at a constant level, which would result in protecting and conserving wetland vegetation sensitive to slight changes in the water table, thereby minimizing environmental impacts and ecological risk.

Many groundwater contaminant plumes at DOE sites discharge into surface water bodies. Where this occurs, the sites are not in compliance with Comprehensive Environmental Response, Compensation, and Liability Act (CERCLA) regulations. Institution of groundwater pumping, with the associated alteration of groundwater flow direction towards the cone of depression created by the well, immediately brings the site into compliance with the applicable CERCLA regulations with regard to containing the contaminated groundwater on site. The treatment of groundwater by filtering through a zeolite bed following pumping involves relatively little added expense, and allows discharge of uncontaminated water. The results are superior to previous methods, such as discharging the pumped groundwater to the ground, where a minimal amount of filtering is accomplished by binding and sorbing to soils. The zeolite filter bed method is also superior to pump and treat methods that utilize ion exchange resins, because the ion exchange resins are prohibitively expensive for a once-through followed by burial procedure, and the high concentrations that result using ion exchange resins produce waste management problems of storage, transportation and disposal, with associated worker and public risk.

A requirement for the use of zeolite filter beds is an area on site designated for their construction. The area would be an uncontaminated, undeveloped part of a nuclear weapons complex site that would be dedicated to permanent waste disposal, such as an uncontaminated part of the 200 area at the Hanford Site in Richland, Wash. Alternatively, the zeolite bed could be constructed in any excavated area where the groundwater was well below the surface, such as an area where a source of contamination has been removed. The existence of the zeolite bed, fully charged with radionuclides and covered over with soil, would constitute the secondarily generated wastes associated with the process.

The zeolite filter bed process described herein presents an in situ method of groundwater treatment that results in remediated groundwater. The method is therefore preferred over containment methods, especially in areas where scarce water resources indicate that aquifers should be remediated and conserved.

At some locations, contaminated groundwater at DOE sites presents low risks to the general population at the present time, because exposure to populations is generally low. However, radioactively contaminated groundwater presents long-term population risks because the eventual migration of the contaminants can be expected to reach surface sources (e.g., rivers, reservoirs) with time. The zeolite filter bed process presents a low risk solution to the problem of population exposure in the future.

While the method and system have been described in particular by the removal through the capture of various metal radionuclides as cations, it is recognized that other waste water contaminants may also be captured and removed by the use of in situ underground zeolite beds, such as, but not limited to: nutrients, e.g. nitrogen-containing compounds, like ammonia; and particularly non-radionuclides, like metal cation contaminants, such as heavy metal, e.g. multivalent, cations; for example, arsenic, lead, zinc, tin, mercury, nickel, cadmium, chromium, iron, copper, cesium, and combinations, may be removed by zeolites from waste water plumes in the same manner and in the same system as described for the radionuclides.

Groundwater contamination is ubiquitous throughout the nuclear weapons complex. The zeolite filter bed process has broad applicability for the remediation of groundwater contaminated by heavy metals and radionuclides. Regulatory agencies are likely to consider zeolite filter beds, when properly operated, to be a permanent solution to groundwater contamination problems. Zeolite filter beds may be adapted for treatment of contaminated surface water on DOE sites, and are especially useful for remediating wetlands.

What is claimed is:

1. A system for the removal of metal contaminants from a contaminated groundwater source, which system comprises:

a) a source of heavy metal-contaminated groundwater;
   b) a trench in the ground and above groundwater level and having a bottom surface with a bottom water barrier layer, and which trench includes zeolite material selected to capture the heavy metal contaminants in the groundwater source and having a top surface;
   c) means to distribute the groundwater from said source over the top surface of the zeolite material to permit the zeolite material to capture and remove the metal contaminants from the contaminated groundwater and to provide a treated groundwater; and
   d) means to withdraw the treated groundwater from the bottom of the trench.

2. The system of claim 1 wherein the groundwater source comprises an underground groundwater plume.

3. The system of claim 1 wherein the bottom water barrier layer comprises a clay liner.

4. The system of claim 1 which includes means to sample the treated groundwater removed from said trench to determine the degree of treatment.

5. The system of claim 1 which includes means to pretreat the metal contaminated groundwater to remove non-radioactive contaminants.

6. The system of claim 1 wherein the means to distribute comprises a pump to pump metal-contaminated groundwater from said source to the top of said zeolite material.

7. The system of claim 6 wherein the groundwater source comprises an underground groundwater plume and the pump means provides a cone of depression about the said groundwater plume to prevent movement of the groundwater plume.

8. The system of claim 1 wherein said means to distribute includes piping generally uniformly to distribute the groundwater over the top surface of the zeolite material.

9. The system of claim 8 wherein the means to withdraw comprises a plurality of pipes on the bottom surface of the trench to withdraw treated groundwater.

10. The system of claim 1 which includes recycle means to recycle, all or a part of the treated groundwater to the top surface of the zeolite material.

11. The system of claim 1 wherein the means to distribute and the means to withdraw comprise a plurality of perforated pipes respectively over the top surface of the zeolite material and on the bottom surface of the trench to distribute and withdraw generally uniformly the metal contaminated groundwater and the treated groundwater.

12. The system of claim 1 which includes closure means to cover the top surface of the zeolite material after the zeolite material is exhausted by the capture and removal of the metal contaminants.

13. The system of claim 12 wherein the closure means comprises a clay or plastic liner covered with soil.

14. The system of claim 1 wherein the zeolite material comprises fine grain natural zeolite material which provides for irreversible capture of the metal contaminants.

15. The system of claim 1 wherein the zeolite material comprises fine grain chabazite.

16. The system of claim 1 wherein the zeolite material includes an admixture with Palygorskite minerals.

17. The system of claim 1 wherein the source of metal-contaminated groundwater includes multivalent heavy metal cation contaminants selected from the group consisting of: lead, zinc, tin, mercury, iron, copper, cesium, nickel, cadmium, chromium, and combinations thereof, and arsenic-contaminated groundwater alone or in combination with heavy metal cation groundwater contaminants.

18. The system of claim 1 wherein the metal-contaminated groundwater comprises metal radionuclides.

19. A system for the removal of contaminants from radionuclide or metal-contaminated waste water in an underground water source, which system comprises:

a) an underground heavy metal or radionuclide contaminated water plume;

b) a trench in the ground and above groundwater level and having a bottom surface with a bottom water barrier layer, and which trench includes granulated zeolite material therein selected to capture, in the crystal lattice structure of the zeolite material, the radionuclide or heavy metal contaminants in the contaminated water plume, the zeolite material having a top surface;

c) pump means to pump the contaminated water from said source to said trench and to provide a cone of depression about the plume water source;

d) means to distribute the contaminated water comprising perforated pipes over the top surface of the zeolite material to distribute the pumped contaminated water generally uniformly over the top surface of the zeolite material to permit the zeolite material to capture and remove the heavy metal or radionuclides from the contaminated water and to provide treated water at the bottom of the trench;

e) means to withdraw treated water comprising perforated pipes on the bottom surface of the trench to withdraw treated water from said trench;

f) means to sample the treated water for the degree of treatment;

g) recycle means to provide for the recycling of all or a part of the treated water to the trench as required; and h) closure means to provide for the covering of the top surface of the zeolite material in the trench after the zeolite material is exhausted, which closure means includes a clay or plastic top liner and a soil over the top liner.

* * * * *